United States Patent

[11] 3,618,666

| [72] | Inventor | Alvin E. Sayers<br>Lloydminister, Alberta, Canada |
|---|---|---|
| [21] | Appl. No. | 2,351 |
| [22] | Filed | Jan. 12, 1970 |
| [45] | Patented | Nov. 9, 1971 |
| [73] | Assignee | Petrolite Corporation<br>Wilmington, Del. |

[54] STEAM INJECTION OF OIL FORMATIONS
2 Claims, No Drawings

[52] U.S. Cl. ................................................ 166/303, 166/272
[51] Int. Cl. .................................................. E21b 43/20
[50] Field of Search ........................................ 166/303, 302, 292, 294, 272–274, 275, 300, 305; 252/8.55 D

[56] References Cited
UNITED STATES PATENTS

| 2,259,875 | 10/1941 | Bent et al. | 166/294 X |
| 2,265,962 | 12/1941 | Bent et al. | 166/281 |
| 2,469,354 | 5/1949 | Bond | 166/292 X |
| 2,614,635 | 10/1952 | Williams et al. | 166/303 X |
| 2,633,919 | 4/1953 | Bauer et al. | 166/300 |
| 2,788,855 | 4/1957 | Peterson | 166/303 |
| 2,816,610 | 12/1957 | Fisher | 166/274 |
| 3,396,792 | 8/1968 | Muggee | 166/305 X |
| 3,454,095 | 7/1969 | Messenger | 166/303 |

*Primary Examiner*—Stephen J. Novosad
*Attorney*—Sidney B. Ring

ABSTRACT: In the process of stimulating the production of petroleum from underground formations by treating the formation with steam, including steam flooding and the "huff and puff" steam soak techniques, the improvement which is characterized by the use of organosilicones in conjunction with steam.

STEAM INJECTION OF OIL FORMATIONS

In general, this invention relates to the steam of oil formations.

In one embodiment, this invention relates to the production of oil from underground formations and pertains more particularly to methods for treating oil-bearing formations with steam through an injection well to reduce the viscosity of oil in the formation and drive it to a producing well in communication with the same formation (also referred to as "steam flooding"), said process being characterized by the use of organo silicones with steam.

In another embodiment, the term "steam treatment" also includes the process of steam and/or hot-water injection, soaking and production return from the same well which is commonly referred to as the "huff and puff" or steam soak technique in petroleum production. With this method one well serves both for the injection of steam or hot water and also for the production of the crude petroleum. The stimulation mechanism of steam treating consists primarily of transferring heat to the crude, reducing its viscosity and promoting flow to the well bore.

The producing formations of many oil fields contain low-gravity oil whose viscosity is high enough to prevent easy flow of the oil through the formation and into a well. In some fields of this type, steam flooding of the formation is carried out through one or more injection wells in order to reduce the viscosity of the production fluid and drive the heated oil to adjacent wells in the same field through which it is produced to the surface.

All secondary recovery operations are in essence a balance between cost and the value of production. Since secondary production must compete with primary production, it is essential that the test of the market place must be met. Thus, the costs of secondary recovery must be minimized.

One of the main expenses in steam treating is the cost of creating energy in the form of steam and transferring this energy to the oil by injection into the formation. Steam reduces the viscosity of the oil and/or drives the oil toward the producing well.

I have now discovered that the efficiency of steam treating, including steam flooding and soaking, can be enhanced by injecting organo silicones in the steam treatment of formations to prevent the formation of emulsions in situ with resultant advantages.

The organo-silicones or organosilicon oxide condensation products contemplated for use according to this invention are composed primarily of a plurality of silicon atoms linked together through oxygen atoms, each silicon atom having attached to it at least one organic radical either directly or through an oxygen atom, and they may contain one or more other substituents, such as hydroxyl groups or halides. Typical organosilicon oxide condensation products which have been found suitable for the purposes of this invention include for example the liquid organosiloxane and the liquid organosilicate condensation products.

The organosiloxanes are sometimes referred to as the organosilicone polymers or condensation products as a result of the fact that they are principally composed of organosilicone residues. They vary in composition depending upon the materials from which they are produced and the method of production. They are usually produced as condensation or polymerization products of the organosilicols including the monosilicols, disilicols and trisilicols and mixtures of these silicols. The organosilicone residues from these three silicols are of three different types. The silicone residue of the monosilicols may be represented generically by the formula

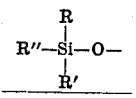

in which R, R', or R'' represent similar or dissimilar organic radicals such as alkyl, aryl, aralkyl, alkaryl or heterocyclic groups. The silicone residue of the disilicols may be represented generically by the formula

in which R and R' represent similar or dissimilar organic radicals such as alkyl, aryl, aralkyl, alkaryl or heterocyclic groups. The silicone residue of the trisilicols may be represented by the formula

in which R represents an organic radical such as an alkyl, aryl, aralkyl, alkaryl or heterocyclic group.

The organosiloxanes or organosilicone condensation products may contain any one or all three of the above types of silicone residues depending upon whether they are produced from pure silicols or mixtures of two or three of the mono-, di- and trisilicols. The condensation products obtainable may be straight chain, cyclic or cross polymerization products and include both solids and liquids. The liquid organosiloxanes or organosilicone condensation products have been found most advantageous for the purposes of this invention.

The organo-mono-silicols when polymerized alone can form only the dimer having the generic formula

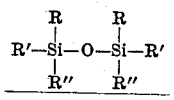

in which R, R' and R'' represent similar or dissimilar organic radicals such as alkyl, aryl, alkaryl, aralkyl and heterocyclic groups. These compounds are generally liquid. However, the condensation products of organo-mono-silicols in admixture with diols and triols are particularly valuable for the purpose of this invention. The presence of monosilicols tends to prevent excessive formation of resinous solids rather than liquid condensation products.

The only liquid condensation products obtained by polymerization of organosilane diols are particularly advantageous agents for the present purposes. The organodisilicol compounds when polymerized alone tend to produce predominantly straight chain polymerization products which may be generically represented by the following formula:

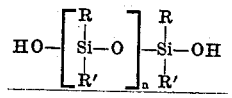

wherein R represents an organic radical, such as alkyl, aryl, aralkyl, alkaryl or heterocyclic group, R' is a similar or dissimilar organic radical and $n$ may be one or higher depending upon the number of organosilicon oxide residues in the complex molecule resulting from the condensation and dehydration of the organosilane diol.

When the organosilane diols are polymerized in the presence of an organosilane monol, the monol tends to substitute at the end of the chain in place of at least one hydroxyl group and produce compounds having the formula

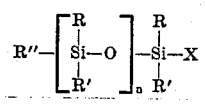

in which R, R' and R'' represent similar or dissimilar organic radicals such as the alkyl, aryl, aralkyl, alkaryl or heterocyclic group, X may be such an organic radical or a hydroxyl group and n may be one or higher. Similarly other terminal groups may be substituted in these compounds in which case the generic structural formula may be represented by

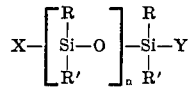

in which R and R' represent similar or dissimilar organic radicals as above and X and Y represent similar or dissimilar organic radicals or inorganic substituents such as hydroxyl radicals, halides or the like and n may be one or higher.

The condensation products obtained from pure organosilane triols are generally resinous solids because of the extensive cross polymerization which takes place, for example cross polymerization products having a formula of the following type:

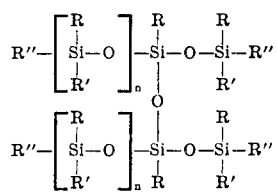

in which R, R' and R'' may be similar or dissimilar alkyl, aryl, aralkyl, alkaryl or heterocyclic group and n may be one or more. It will be understood that this formula is merely illustrative of cross polymerization products suitable for the purposes of this invention and such products may take other forms in which two or more cross-linkings between polymers are established. Such compounds may take a form in which they resemble cyclic compounds for example:

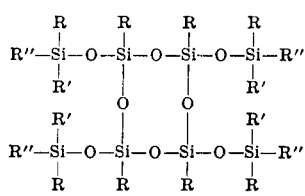

in which R, R' and R'' may be similar or dissimilar alkyl, aryl, aralkyl, alkaryl or heterocyclic groups.

The molecular weight and other properties of the organosiloxanes or silicone condensation products vary with the extent of the dehydration and condensation of the silicols from which they are produced and with the particular organic radicals present. While some of them are resinous or rubbery solids, others are oily liquids. For the purposes of the present invention, the liquid condensation products are particularly effective. These viscous oily liquids, in general, have low surface tensions and low interfacial tensions toward hydrocarbon oils. They also have low solubility in hydrocarbon oils and are readily dispersible in such oils, particularly mineral lubricating oils. In general, the condensation products containing simple organic radicals, such as methyl, ethyl and short-chain alkyl groups, are most advantageous for the purposes of this invention, as they have exceedingly small solubility in most hydrocarbon oils.

The liquid condensation products of dimethylsilane diol are most advantageous for our purposes. However, very good results have also been obtained from condensation products of mixtures containing trimethylsilane monol, dismethylsilane diol and methylsilane triol. Dimethylsilane diol has the following formula:

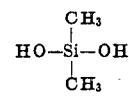

It is customarily produced from silicon tetrachloride through the Grignard reaction as follows:

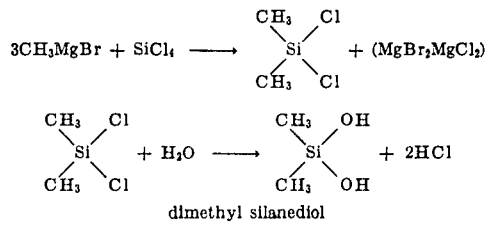

dimethyl silanediol

In this reaction all of the silicon tetrachloride may not be converted to the dimethylsilane diol. The product may then consist of a mixture of trimethylsilane monol, dimethylsilane diol and methylsilane triol. This reaction product may be polymerized directly to produce satisfactory agents for the purpose of this invention. Alternatively, intermediate separation may be effected so that polymers of the individual silicols may be produced.

Another class of liquid organosilicon oxide condensation products includes the organosilicate condensation products represented by the probable formula:

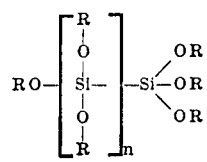

in which R represents an organic radical such as an alkyl, aryl, aralkyl, alkaryl or a heterocyclic group and n many be one or higher depending upon the number of organosilicate residues in the complex molecule of the condensation product.

These compounds may be obtained as the polymerized hydrolysis products of the esters of ortho silicic acid by controlled hydrolysis of the tetra orthosilicate esters with water.

In summary, the term "organosilicone" includes organosilicon oxide condensation products of silanols or organosilicols referred to herein are intended to include both silicones and silicates, preferably normally liquid, of the following general compositions:

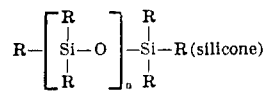

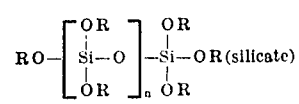

wherein R represents similar or dissimilar organic radicals such as alkyl, aryl, alkyaryl, aralkyl and heterocyclic groups; the terminal R's and OR's or other R's and OR's may be substituted by hydroxyl groups; and n is one or more. Such compounds and their methods of preparation to form compounds of different viscosities are well known to the art. Where R in the foregoing formula is an aromatic hydrocarbon grouping, intrasubstituents such as a halogen a nitrogen-containing radical as NO₃or NH₂, a sulfur-containing radical such as SO₃H or SH, or a phosphorus-containing radical such as phosphite, phosphate or the thio derivatives thereof may occur.

Typical compounds include dimethyl silicone, methyl phenyl silicone, ethyl butyl silicone, methyl cyclohexyl silicone, dicyclohexyl silicone, diphenyl silicone, hydroxy phenyl methyl silicone, phenyl propyl silicone, phenyl isopropyl silicone, tolyl butyl silicone, tolyl amyl silicone, phenyl hydroxy ethyl silicone and the corresponding polymers of methyl orthosilicate and ethyl orthosilicate. Compounds containing simple organic radicals such as methyl, ethyl and short-chain alkyl groups are preferred. Such compounds may have hydroxyl groups or organic radicals as terminals.

FIELD EXAMPLE

Prior to Antifoam "B" silicone treatment, foamy oil and water production caused a severe demulsification problem in the produced oil. In addition hole pumps where unable to pump the foamy fluid due to frequent air locking of these pumps.

Antifoam "B" silicone was injected with the steam at a rate of 100 p.p.m. of the steam injected during the "Huff" part of a "Huff and Puff" method of initial oil recovery at the rate of 3 gallons of Antifoam "B" per day with about 1,500 barrels of steam water per day or 48 p.p.m. for 21 days of a complete "Huff" cycle. The well was regulated to 1,500 p.s.i. injection pressure at whatever volume of steam was required to maintain this pressure.

One was able to inject the total required volume of 30,000 barrels of steam in 19½ days instead of the 21-day interval previously required to inject the volume of steam prior to silicone treatment.

The well flowed back for 20 days instead of the usual 5 days on previous return of the production period. The well is presently pumping back at a rate that is considerably higher than previously recorded at this stage of the cycle.

Little or no foaming problems was experienced. With this treatment, there has been little or no demulsification problems encountered with this well during this production period.

There was a considerable increase in the volume of produced fluid from this well although this was carried out after the well had 2 years of previous steaming and then producing.

This example illustrates that silicone treatment in steam floods
1. inhibits foaming
2. inhibits 0/W and W/0 emulsion formation
3. increases injection rate of steam
4. increases the production period
5. increases the production rate.

In addition, the use of silicones inhibits the production of silica-containing scale.

Dow Corning Antifoam "B" emulsion is an emulsion containing 10 percent active silicone which is designed primarily for aqueous systems. It is a dimethyl siloxane that has repetitive

units.

In carrying out the process of this invention, silicones are injected with steam in the normal manner. The concentration of silicone in the steam will vary depending on conditions. In general, I employ silicone in steam in concentrations of at least about 1 p.p.m., such as from about 1 to 1,000 p.p.m., or more, for example from about 5 to 500 p.p.m. but preferably from about 8 to 100 p.p.m. Optimum results are achieved in concentration of from about 10 to 20 p.p.m. Greater or lesser concentrations can be employed but cost-performance considerations generally govern the concentration employed. The above figures are based on active silicones, not on inactive solvents, emulsifying phases, etc. For example, not that Antifoam "B" has only 10 percent active silicone.

As is quite evident, other organosilicones are known or will be constantly developed which could be useful in this invention. It is, therefore, impossible to attempt to describe the invention in its broader aspects in terms of specific names of organosilicones used as it would be too voluminous and unnecessary since one skilled in the art could by following the procedures described herein select the proper agent. This invention lies in the use of organosilicones and the physical form thereof used in carrying out this invention and their individual composition is important only in the sense that their properties can effect this function. To precisely define each specific organosilicone useful in light of the present disclosure would merely call for knowledge within the skill of the art in a manner analogous to a mechanical engineer who prescribes, in the construction of a machine, the proper materials, and the proper dimensions thereof. From the description in this specification and with the knowledge of a chemist, one will know or deduce with confidence the organo silicone suitable for this invention. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any suitable organosilicone that can perform the function stated herein can be employed.

Having thus described my invention that I claim as new and desire to obtain by Letters Patent is:

1. A process of injecting steam into a subsurface oil-producing formation to stimulate oil production which is characterized by adding an organosilicone to said steam prior to the introduction thereof to said formation.

2. The process of claim 1 which the organosilicone is a methyl silicone.

* * * * *